June 19, 1928.

H. R. VAN DEVENTER

VEHICLE SIGNAL SWITCH

Filed Feb. 11, 1922

INVENTOR

H. R. Van Deventer

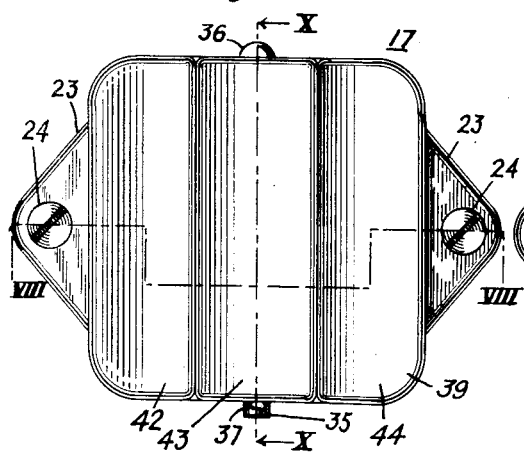
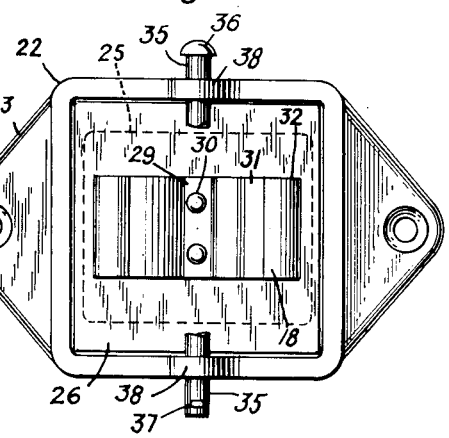
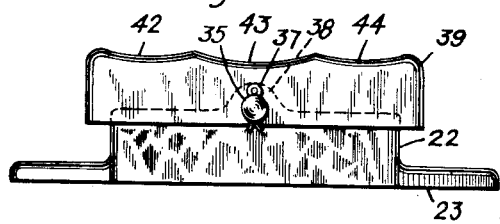
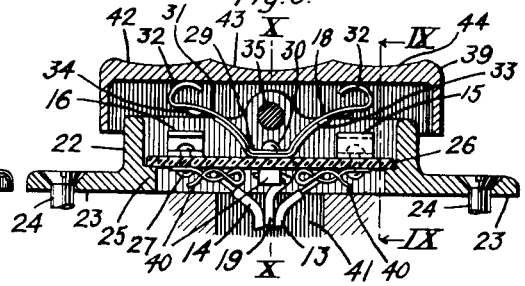
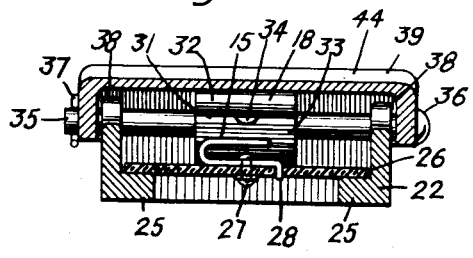
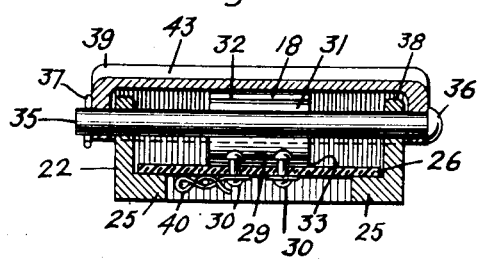

Patented June 19, 1928.

1,674,027

UNITED STATES PATENT OFFICE.

HARRY R. VAN DEVENTER, OF PITTSBURGH, PENNSYLVANIA, ASSIGNOR, BY MESNE ASSIGNMENTS, TO EXCEL PRODUCTS CORPORATION, A CORPORATION OF PENNSYLVANIA.

VEHICLE SIGNAL SWITCH.

Application filed February 11, 1922. Serial No. 535,716.

My invention relates to signalling systems and particularly to traffic signal systems carried by automobiles or other vehicles to indicate stops and turns.

One object of my invention is to provide a device of the above-indicated character that shall be readily adaptable to, and mounted on, a vehicle with a minimum expenditure of time and labor.

Another object of my invention is to provide a vehicle signalling system that shall comprise few standard parts, such as ordinary incandescent lamps, for the signals proper.

Another object of my invention is to provide means whereby an automobile driver may selectively operate, with one foot, different warning signals and, at the same time and with the same foot, freely and effectively operate a clutch pedal or other foot-operated means substantially as effectively as if the signal-operating means were not present.

Another object of my invention is to provide a plurality of signals that are so grouped or positioned with respect to a tail lamp as to co-operate therewith to ensure that the proper warning or direction signal shall be unmistakably given.

A further object of my invention is to provide a vehicle signalling system in which the lamps or signals indicating the turns and the tail lamp or signal may be operated intermittently to more forcibly attract attention thereto.

Heretofore, attempts have been made to provide stop-and-turn-signal devices for automobiles and other vehicles but, to the best of my knowledge, none of the devices for indicating both stops and turns have come into extended use, by reason of the difficulty and expense of installation and the uncertainty of operation.

Several forms of a clutch-operated signal for giving the single warning "stop" have been suggested and employed, but these have the objection thereto that the "stop" warning is given at times when stopping is not the actual intention of the driver giving the signal. For instance, in making a turn, the clutch is almost invariably thrown out and, in so doing, the above-mentioned signal only indicates "stop." When the turn is to be to the left and the signal indicates "stop," a driver following may attempt to pass to the left, with the attendant possibility or likelihood of a collision.

It has also heretofore been suggested to control automobile traffic signals from a position on the steering wheel or column but, in such instances, relatively complicated and expensive structures are usually employed which also require hand operation at times when a driver may have both hands occupied with the steering wheel and the gear-shift operating arm.

To extend the conducting leads through the steering column is a relatively difficult and expensive operation, because the columns are not usually adapted for this purpose and require special switches, insulating bushings and machine work, during installation, which render such forms of device undesirable. To provide special conduits or casings outside the column renders the device cumbersome, expensive and unsightly.

In practicing my invention, I provide a vehicle signalling system and a pedal or switch for so operating a plurality of signals as to give a warning of the actual intention of the driver giving the signal. The pedal is also so adapted for foot-operation as to permit the driver to be free to use his hands to safely control the car and, at the same time, to not interfere with any necessary operation, in the control of the car, that may require foot-operation.

The pedal being located on, or adjacent to, the floor board of the driver's compartment, the conducting leads are shorter than would be required to extend them to the dashboard or other position near the driver's hands, and the construction is simpler and more economical than devices wherein the signal control lever, switch or handle is on the steering wheel or column.

Another feature of my invention is the particular relation of the signals proper, in which the tail or stop signals are so centrally or intermediately disposed with respect to the right and left-turn signals as to therewith ensure that the signal intended may not be misunderstood, even from a relatively great distance. In other words, where a single usual form of lamp is employed to indicate a particular signal, and whether or not it is used to illuminate a direction-indicating arrow or inscription, there is the possibility that the arrow or inscription may be misunderstood unless it is prohibitively large. In the device of my invention, the tail lamp is employed as a directing center or origin in conjunction with which the other signals are so illuminated in definite relation thereto as to ensure the proper warning by the mere presence of a plurality of certain lights, irrespective of other sign or inscription on the signal, or elsewhere.

A system and the parts thereof, embodying my invention, are illustrated in the accompanying drawings, in which similar parts are designated by similar reference characters throughout.

Fig. 5 is a plan view of a foot-operated pedal or switch included in the system of my invention;

Fig. 6 is a view, similar to Fig. 5, with the combination top cover and operating member removed;

Fig. 7 is a side elevational view taken at right angles to Fig. 5;

Fig. 8 is a view similar to Fig. 7 taken along the line VIII—VIII of Fig. 5;

Fig. 9 is a sectional view taken along the line IX—IX of Fig. 8, at right angles thereto, and Fig. 10 is a view, similar to Fig. 9, taken along the line X—X of Fig. 8.

Figure 1:
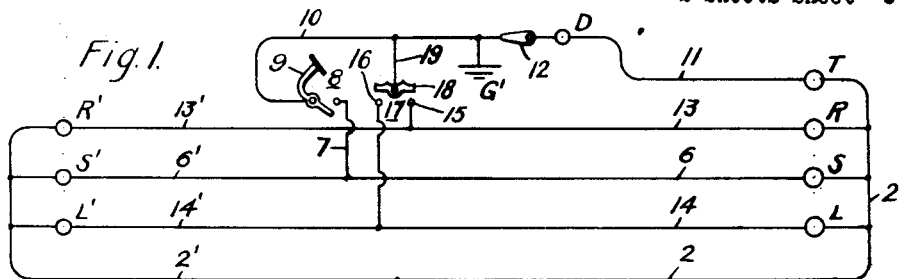
Fig. 1 is a diagrammatic view of a system embodying one form of my invention.

As shown in Fig. 1, a tail signal T, a right-turn signal R, a stop signal S and a left-turn signal L, while preferably being ordinary incandescent lamps, may be any suitable electrically-actuated devices that are connected, by a common conductor 2, to the positive terminal 3 of a battery 4, the negative terminal 5 of which is connected to a ground connection G. The stop signal S is connected, by conductors 6 and 7, to a switch 8 that is operated by a clutch or brake pedal 9 and, through the switch 8 and a conductor 10, to a ground connection G'.

The tail signal T is connected, by a conductor 11 and through the usual dash or speedometer light D, to a usual switch 12 and from the latter to the ground connection G'.

The right-turn signal R and the left-turn signal L are connected, through conductors 13 and 14, to stationary contact terminal members 15 and 16, respectively, of a pedal switch 17 and, from the movable member 18 of the latter, through a common conductor 19 and a portion of the conductor 10, to the ground connection G'.

The system above-described may be further provided with auxiliary signals R', S' and L' that are connected, by a common conductor 2', to the positive terminal 3 of the battery 4 and, by conductors 13', 6' and 14', respectively, to the conductors 13, 6 and 14 of the respective main signals R, S and L to be operated simultaneously with the latter.

Figure 4:
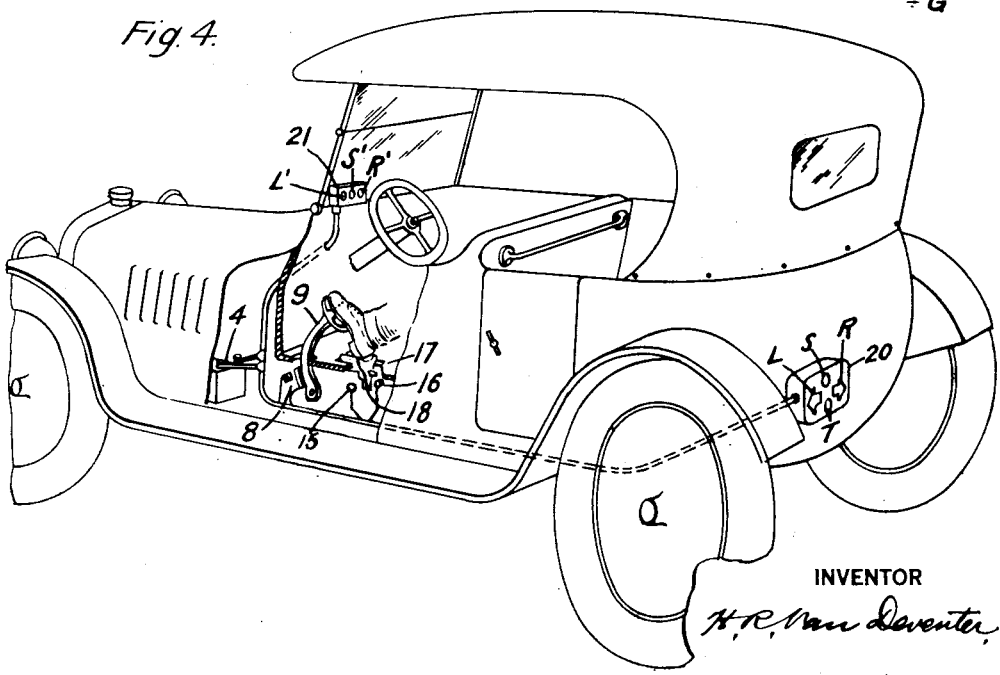
Fig. 4 is an outline or diagrammatic perspective view of an automobile, with parts broken away, and illustrating the manner in which a system as shown in Figs. 1 and 2 may be mounted in operative position.

The arrangement of the above-described system, in an automobile, is shown in Fig. 4, in which the main signals L, S, R and T are disposed in a casing 20, or other suitable support, at the rear of the vehicle and the auxiliary signals L', S' and R' are disposed in a casing 21, at a position readily visible to the driver.

The signals S and T are disposed in vertical alignment and the signals L and R in horizontal alignment along a line intersecting the vertical line at a point intermediate the signals S and T. This arrangement, whereby the tail lamp constitutes a neutral or origin light for simultaneous operation with each of the other signals, ensures the proper warning by the relation of the other signals thereto. All of the signals may, therefore, consist of ordinary incandescent lamps and bull's-eyes for use with or without inscriptions or direction forms, such as arrows.

The casing 21 may be provided, at one side, with bull's-eyes, as shown, corresponding to the respective auxiliary signals which are visible to the driver and, on the opposite side, with bull's-eyes, not shown, which are visible to traffic officers and others in advance of the vehicle.

The pedal switch 17, which will hereinafter be more fully described, is disposed in such position adjacent to the pedal 9 as to normally constitute substantially a foot or heel rest for the same foot which the driver employs to operate the pedal 9. The pedal switch 17 is also readily operable, by a relatively slight movement of the driver's heel, and is of such construction and so related to the pedal 9 as to readily maintain the driver's heel in position thereon for instant operation, irrespective of the position in which he may be holding, or in which direction he may be moving, the pedal 9. In other words, the pedal 17 is adapted for instant easy operation at any time, irrespective of whether the pedal 9 is being moved inwardly or outwardly or is stationary in any position.

As shown in Figs. 5 to 10, inclusive, the pedal 17 comprises a relatively low supporting casing or frame 22 having apertured side lugs or plate-like projections 23 on opposite sides of its lower edges through which, and into the floor of the vehicle, bolts or screws 24 extend to secure the switch in position. An inner flange 25 supports an insulating plate 26, of fibre or other suitable material, upon which the stationary contact terminal members 15 and 16 and the movable contact member 18 are mounted.

As shown in Figs. 8 and 9, the stationary contact members 15 and 16 each comprise a metal member, preferably of copper and of substantially C-shape, secured, at its lower portion, to the insulating plate 26, by a rivet or screw 27, and having its upper portion in yieldable suspension for effective contact with one end of the movable contact member 18. Having one end 28 of each stationary contact member extending into or through the insulating plate 26, as shown in Fig. 9, the stationary contact members may each be secured in fixed position by the use of a single rivet or screw 27. The movable contact member 18 is preferably constructed of strap copper having a lower portion 29 secured, by rivets 30, to the insulating plate 26 and upwardly and outwardly curved portions 31 having inwardly extending rounded upper ends 32.

A re-inforcing member 33, preferably of strap spring steel, is provided for the movable contact member 18, between the latter and the insulating plate 25, and extends for a distance along the under side of the contact members 18. The latter may also be provided with spherical indentations, on one side, that form contact-making knobs or projections 34, on the opposite side, as shown in Figs. 8 and 9, for engagement with the stationary contact members 15 and 16.

A bolt or shaft 35, held in position by a head 36 and a cotter pin 37, is mounted in apertured bosses or bearings 38, that are preferably integral with the casing 22, and extends through the casing transversely to, and between, the upper ends 32 of the movable contact member 18.

A member 39 that serves as a combination operating and cover member for the pedal 17 is of shallow inverted substantially box-like construction that is pivotally mounted on the bolt 35 and is provided with a depending flange that normally extends to a position slightly below, and spaced around, the upper edges of the casing 22. The member 39 is normally held or balanced in the mid or "off" position of the pedal switch 17 by the movable contact member 18, the upper ends 32 of which engage the under surfaces of the member 39. The stationary and movable contact members 15, 16 and 18 are provided with Fahnestock clips 40, by which they are connected to the conductors 13, 14 and 19, respectively.

A slot or opening 41, provided in the vehicle floor, is of sufficient length and width to permit the insulating plate 26, and the assembled and connected parts and conductors thereon, to be placed in position from beneath the floor. The casing 22 is first screwed or bolted in position above and completely surrounding the slot 41. The insulating plate 26, with parts thereon, as above described, is then passed vertically and edgewise through the slot and turned to its horizontal position on the flange 25, in which position it closely fits and conforms to the inner side walls of the casing 22. The cover or operating member 39 is then mounted in position and the bolt 35 passed through the side walls thereof and through the bosses or bearings 38. The cover or operating member 39 is provided, on its upper surface, with foot or heel-conforming portions or grooves 42, 43 and 44, from left to right in the order named, which correspond to the left, off and right-signal positions of the switch. The grooves 42, 43 and 44 preferably extend parallel to the longitudinal axis of the vehicle, in the position which the heel of the foot which the driver uses to operate the pedal 9 would naturally be whether the pedal switch 17 were present or not. Thus, the attention of the driver need not be diverted, even slightly, when he desires to give a warning signal, as it would be with any signal switch of which I am aware that is not operated directly by a member having another function, such as the switch 8 on the pedal 9. In other words, the driver, in this instance, may operate a selective variety of warning signals substantially as readily as with certain single-stop signals which are operated by brake or clutch pedals.

In operation, the driver normally places one foot substantially directly out before him with the sole of the foot in an easy natural position on the brake or clutch pedal 9. In this position, the central or "off" groove 43 of the pedal switch 17 is in the normally natural position taken by the heel of the same foot. When, in driving, the driver depresses the pedal 9 to throw out the clutch or to put on the brake, as the case may be, he does so by pivoting his foot forwardly on the heel thereof to press the pedal 9 with the sole of his foot. This operation closes the switch 8, on the pedal 9, to complete a circuit from the positive terminal 3 of the battery 4, through the conductor 2, to the signal S, through the conductors 6 and 7 to the switch 8 and through the conductor 10, to the ground connection G'.

This operation alone signifies that the driver is stopping, or decreasing the speed of, his car.

In making a left turn and whether he is depressing the pedal 9 or not at the time, it is only necessary for the driver to turn his heel slightly to the left to a position in the left groove 42 on the pedal 17 or to a position on the slight ridge between the grooves 42 and 43. He may do this without removing the sole of his foot from the pedal 9, to thus signal that the turn is to be made either with or without decreased speed, as indicated by the stop signal S.

The above-described operation causes the cover or operating member 39 to so pivot on the bolt 35, against the action of the spring 33 and the movable contact member 18, as to cause the latter to engage the stationary contact member 16. This engagement completes a circuit from the conductor 2 to the left signal L, through the conductor 14 to the stationary contact member 16 and through the movable contact member 18 and the conductors 19 and 10 to the ground connection G'.

Similarly, in making a right turn, the driver, by moving his heel to the right, causes a circuit to be completed from the conductor 2 to the right signal R, through the conductor 13 to the stationary contact member 15 and through the movable contact member 18 and the conductors 19 and 10 to the ground connection G'.

Further, in the above-described operation, the auxiliary signals S', L' and R' will be operated by circuits completed through the auxiliary conductors 2', 6', 14', 13' and the switches 8 and 17 to the ground connection G', to give corresponding indication to the driver and to a traffic officer or other person in advance of the vehicle.

Figure 2:
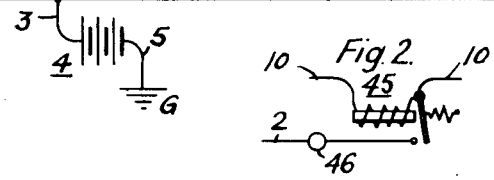
Fig. 2 is a diagrammatic view of an auxiliary device that may or may not be included in the system shown in Fig. 1.

As shown in Fig. 2, a contact-making relay 45 for insertion in the circuit of the system above described, between the switches 8 and 17, on the one side, and the ground connection G', on the other side, may be employed to energize a lamp or other device 46 to indicate whether the signals R, S and L are in proper working order. This device may be employed either with, or as a substitute for, the auxiliary signals R', S' and L'.

Figure 3:
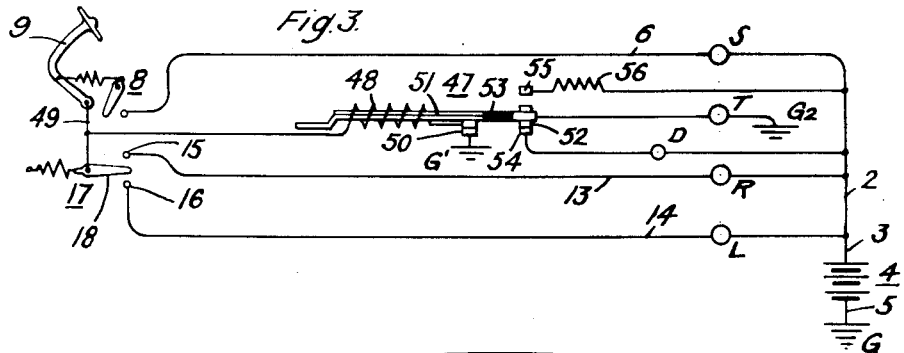
Fig. 3 is a diagrammatic view, similar to Fig. 1, of a modified form of the system embodying my invention.

A further modification of my invention is illustrated in Fig. 3, in which the tail signal T is adapted to be flashed intermittently and alternately with whichever of the signals R, S and L is being operated. In this system, a thermo-responsive relay 47, of any suitable form, may comprise a heating coil 48 connected from a conductor 49, that connects the switches 8 and 17, to the ground connection G' through the contact members 50. A thermo-responsive device 51, such as a usual bi-metallic element, is actuated by the coil 48 to disengage the normally closed contact members 50 and further carries a contact member 52 that is insulated, as by a strip of insulation 53, from the element 51 and is adapted to normally engage a stationary contact member 54. The latter is connected, through the dash lamp D, to the conductor 2. The contact member 52 is also adapted, when the coil 51 is sufficiently heated, to engage a stationary contact member 55 that is connected, through a compensating resistor 56, to the conductor 2.

In operation, when the driver depresses the pedal 9 to close the switch 8, a circuit is completed from the battery 4 and the conductor 2, to the stop signal S, through the conductor 6 and the switch 8 to the conductor 49 and, from the latter, through the heating coil 48 and the contact members 50 to the ground connection G'.

At the same instant, a circuit is completed from the conductor 2, through the dash lamp D, the contact members 54 and 52 and the tail signal T to a ground connection $G^2$. Thus, at the first instant that the switch 8 is closed, the signals S and T will be actuated simultaneously. Immediately, the heating coil 48 will actuate the element 51 to disengage the contact member 52 from the contact member 54. This action momentarily de-energizes the dash and stop signals D and S, respectively, and by causing the contact member 52 to engage the contact member 55 shunts the stop-signal current through the compensating resistor 56. Thus, alternate signals consisting of a momentary flash of the stop and tail signals together and a flash of the tail signal alone will be given. By a simple re-arrangement of contact members and circuits, not deemed necessary to show, various flash combinations, such as alternate simultaneous flashes of the tail and direction signals and alternate flashes consisting, at the one flash, of the tail and direction signal and, at the other flash, of the direction signal alone, could, of course, be effected.

The signals R and L will flash in similar combination with the tail signal T when the switch 17 is operated to the right and to the left.

The above-described modified form of my invention is adapted to more forcibly attract attention and to thereby render the device very effective.

My invention provides a device of extremely economical construction that is very easy to install and of such great facility of operation as to permit a driver to signal a variety of warnings without in any way interfering with effective and safe operation of the car.

While I have shown and described particular forms of my invention, changes may be effected therein without departing from the spirit and scope thereof, as set forth in the appended claims.

I claim as my invention:

1. Operation indicating mechanism for automobiles of the type having a foot operated control pedal, comprising signaling means for indicating turns, and means to effect operation of said signaling means mounted on a stationary part of said automobile and comprising an operating part extending rearwardly of said pedal and entirely independent of said pedal and operable by lateral pressure exerted by the rear of a foot of the driver while said foot is in an operating position upon said pedal in any position of said pedal.

2. Operation indicating mechanism for automobiles of the type having a foot operated control pedal, comprising signaling means for indicating turns, and means to effect operation of said signaling means mounted on a stationary part of said automobile and comprising an operating part extending rearwardly of said pedal and entirely independent of said pedal and operable by the rear of a foot of the driver by lateral pivotal movement of said foot about the ball of said foot while said ball is in an operating position upon said pedal in any position of said pedal.

3. To be positioned in an automobile having a foot operated control pedal and carrying automobile turn signaling mechanism, and positioned on a stationary part of said automobile with an operating part extending rearwardly of said pedal, means for effecting operation of said mechanism comprising said operating part extending rearwardly of said pedal and independent of said pedal and operable, when said means is in position in the automobile, by lateral pressure exterted by the rear of a foot of the driver while said foot is in an operating position upon said pedal in any position of said pedal.

4. To be positioned in an automobile having a foot operated control pedal and carrying automobile turn signaling mechanism, and positioned on a stationary part of said automobile with an operating part extending rearwardly of said pedal, means for effecting operation of said mechanism comprising said operating part extending rearwardly of said pedal and entirely independent of said pedal and operable, when said means is in position in the automobile, by the rear of a foot of the driver by lateral pivotal movement of said foot about the ball of said foot with said ball in an operating position upon said pedal in any position of said pedal.

5. In a signal system for vehicles, the combination with a vehicle having a control pedal, and electrically controlled signal apparatus carried by the vehicle for indicating intended turning movements of the vehicle, means for controlling said apparatus including switch mechanism mounted upon a stationary part of the vehicle adjacent to the said pedal, to permit of its actuation by pressure exerted by the heel of the operator when actuating the pedal with his toe, pressure on the right side or left side of said switching mechanism causing a corresponding indication of intended turning movement of the vehicle.

6. In a signal system for vehicles, the combination with a vehicle having a control pedal, and electrically controlled signal apparatus carried by the vehicle for indicating intended turning movements of the vehicle, of switch mechanism for controlling said apparatus mounted upon a stationary part of the vehicle adjacent to the said pedal to permit of its actuation by pressure exerted by the heel of the operator when actuating the pedal with his toe, and comprising a single cover and actuating member that is tiltable to the right or the left to indicate a corresponding intended turning movement of the vehicle.

7. Operation indicating mechanism for automobiles of the type having a foot operated control pedal, comprising signaling means for indicating intended movements of the automobile and means to effect operation of said signalling means mounted on a stationary part of said automobile and comprising a base member, electric-insulating member supported by said member, a plurality of co-operating contact members mounted on said electric-insulating member, and a single combined contact-operating and cover member pivotally mounted on said base member, said cover member having three heel engaging grooves in its upper surface to permit of its operation by lateral pivotal movement of the heel of the foot of an operator while the ball of the foot is in an operating position on the foot pedal.

In testimony whereof, I have hereunto subscribed my name this 24th day of January, 1922.

HARRY R. VAN DEVENTER.